US009851828B2

(12) United States Patent
Richards et al.

(10) Patent No.: US 9,851,828 B2
(45) Date of Patent: Dec. 26, 2017

(54) TOUCH FORCE DEFLECTION SENSOR

(71) Applicant: Apple Inc., Cupertino, CA (US)

(72) Inventors: Peter W. Richards, San Francisco, CA (US); Sinan Filiz, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/776,610

(22) PCT Filed: Mar. 15, 2013

(86) PCT No.: PCT/US2013/032697
§ 371 (c)(1),
(2) Date: Sep. 14, 2015

(87) PCT Pub. No.: WO2014/143066
PCT Pub. Date: Sep. 18, 2014

(65) Prior Publication Data
US 2016/0034088 A1 Feb. 4, 2016

(51) Int. Cl.
*G06F 3/041* (2006.01)
*G06F 3/045* (2006.01)
(Continued)

(52) U.S. Cl.
CPC ............. *G06F 3/0414* (2013.01); *G01L 1/14* (2013.01); *G01L 1/205* (2013.01); *G01L 1/2287* (2013.01);
(Continued)

(58) Field of Classification Search
CPC .. G06F 3/0485; G06F 3/04815; G06F 3/0488; G06F 3/044; G06F 3/0414; G06F 2203/04106; G06F 3/041
See application file for complete search history.

(56) References Cited

U.S. PATENT DOCUMENTS

| 4,527,862 A | 7/1985 | Arakawa |
| 5,343,064 A | 8/1994 | Spangler et al. |

(Continued)

FOREIGN PATENT DOCUMENTS

| CN | 1577385 | 2/2005 |
| CN | 1582453 | 2/2005 |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Alexander Eisen
*Assistant Examiner* — Nan-Ying Yang
(74) *Attorney, Agent, or Firm* — Brownstein Hyatt Farber Schreck, LLP

(57) ABSTRACT

A touch sensitive input system for an electronic device includes a deflection sensor configured to generate a deflection signal based on deflection of a control or sensing surface, and a processor in signal communication with the deflection sensor. The processor is operable to generate a deflection or displacement map characterizing displacement of the surface based on the deflection signal, and a force map characterizing force on the surface based on a transformation of the displacement map. The transformation may be based on a generalized inverse of a compliance operator, where the compliance operator relates the displacement map to the force map. The compliance operator is not necessarily square, and does not necessarily have a traditional inverse.

17 Claims, 5 Drawing Sheets

(51) Int. Cl.
*G01L 1/20* (2006.01)
*G01L 1/14* (2006.01)
*G01L 1/22* (2006.01)
*G06F 3/044* (2006.01)
*G06T 15/04* (2011.01)

(52) U.S. Cl.
CPC .............. *G06F 3/044* (2013.01); *G06F 3/045* (2013.01); *G06T 15/04* (2013.01); *G06F 2203/04106* (2013.01)

(56) References Cited

U.S. PATENT DOCUMENTS

| | | | |
|---|---|---|---|
| 5,929,517 A | 7/1999 | Distefano et al. | |
| 6,002,389 A | 12/1999 | Kasser | |
| 6,079,282 A | 6/2000 | Lanter | |
| 6,154,580 A | 11/2000 | Kuriyama et al. | |
| 6,323,846 B1 | 11/2001 | Westerman et al. | |
| 6,545,495 B2 | 4/2003 | Warmack et al. | |
| 6,568,275 B2 | 5/2003 | Scholz et al. | |
| 6,570,557 B1 | 5/2003 | Westerman et al. | |
| 6,570,707 B1 | 5/2003 | Murakami | |
| 6,676,611 B1 | 1/2004 | Bromba | |
| 6,677,932 B1 | 1/2004 | Westerman | |
| 6,989,728 B2 | 1/2006 | Van Zeeland et al. | |
| 7,158,122 B2 | 1/2007 | Roberts | |
| 7,211,885 B2 | 5/2007 | Nordal et al. | |
| 7,337,085 B2 | 2/2008 | Soss | |
| 7,409,876 B2 | 8/2008 | Ganapathi et al. | |
| 7,511,702 B2 | 3/2009 | Hotelling | |
| 7,538,760 B2 | 5/2009 | Hotelling et al. | |
| 7,609,178 B2 | 10/2009 | Son et al. | |
| 7,784,366 B2 | 8/2010 | Daverman et al. | |
| 7,800,592 B2 | 9/2010 | Kerr et al. | |
| 7,920,134 B2 | 4/2011 | Krah | |
| 8,072,437 B2 | 12/2011 | Miller et al. | |
| 8,169,332 B2 | 5/2012 | Son | |
| 8,169,416 B2 | 5/2012 | Han | |
| 8,253,711 B2 | 8/2012 | Kim et al. | |
| 8,274,495 B2 | 9/2012 | Lee | |
| 8,334,849 B2 | 12/2012 | Murphy et al. | |
| 8,351,993 B2 | 1/2013 | Nunes | |
| 8,390,481 B2 | 3/2013 | Pance et al. | |
| 8,421,978 B2 | 4/2013 | Wang et al. | |
| 8,436,823 B2 | 5/2013 | Kanehira et al. | |
| 8,547,350 B2 | 10/2013 | Anglin et al. | |
| 8,577,289 B2 | 11/2013 | Schlub et al. | |
| 8,577,644 B1 | 11/2013 | Ksondzyk et al. | |
| 8,633,916 B2 | 1/2014 | Bernstein et al. | |
| 8,638,316 B2 | 1/2014 | Badaye et al. | |
| 8,669,963 B2 | 3/2014 | Baker et al. | |
| 8,711,122 B2 | 4/2014 | Wada et al. | |
| 8,724,861 B1 | 5/2014 | Sun | |
| 8,743,083 B2 | 6/2014 | Zanone et al. | |
| 8,760,413 B2 | 6/2014 | Peterson et al. | |
| 8,780,055 B2 | 7/2014 | Marchand et al. | |
| 8,830,205 B2 | 9/2014 | Chang et al. | |
| 8,913,031 B2 | 12/2014 | Honda et al. | |
| 8,922,523 B2 | 12/2014 | Lynch et al. | |
| 8,963,874 B2 | 2/2015 | Li et al. | |
| 9,001,080 B2 | 4/2015 | Okayama et al. | |
| 9,024,907 B2 | 5/2015 | Bolender | |
| 9,030,440 B2 | 5/2015 | Pope et al. | |
| 9,057,653 B2 | 6/2015 | Schediwy et al. | |
| 9,086,768 B2 | 7/2015 | Elias et al. | |
| 9,088,282 B2 | 7/2015 | Holenarsipur et al. | |
| 9,092,129 B2 | 7/2015 | Abdo et al. | |
| 9,104,898 B2 | 8/2015 | Case | |
| 9,116,569 B2 | 8/2015 | Stacy et al. | |
| 9,207,134 B2 | 12/2015 | Ting et al. | |
| 9,229,587 B2 | 1/2016 | Kawaguchi et al. | |
| 9,262,002 B2 | 2/2016 | Momeyer et al. | |
| 9,354,752 B2 | 5/2016 | Kanehira et al. | |
| 9,375,874 B2 | 6/2016 | Lin et al. | |
| 9,390,308 B2 | 7/2016 | Mankowski et al. | |
| 9,411,458 B2 | 8/2016 | Worfolk et al. | |
| 9,430,102 B2 | 8/2016 | Prest et al. | |
| 9,494,473 B2 | 11/2016 | Hanson et al. | |
| 9,541,578 B2 | 1/2017 | Shimada et al. | |
| 9,671,889 B1 | 6/2017 | Miller et al. | |
| 9,678,586 B2 | 6/2017 | Reynolds | |
| 9,715,301 B2 | 7/2017 | Kuboyama et al. | |
| 2003/0214485 A1* | 11/2003 | Roberts | G06F 3/0418 345/173 |
| 2006/0066582 A1* | 3/2006 | Lyon | G06F 3/0488 345/173 |
| 2006/0197753 A1 | 9/2006 | Hotelling | |
| 2007/0272919 A1 | 11/2007 | Mori et al. | |
| 2009/0015564 A1 | 1/2009 | Ye et al. | |
| 2009/0066345 A1 | 3/2009 | Klauk et al. | |
| 2009/0237374 A1 | 9/2009 | Li et al. | |
| 2010/0024573 A1* | 2/2010 | Daverman | G01L 1/142 73/862.626 |
| 2010/0045628 A1 | 2/2010 | Gettemy et al. | |
| 2010/0053116 A1* | 3/2010 | Daverman | G06F 3/0414 345/175 |
| 2010/0117989 A1* | 5/2010 | Chang | G06F 3/042 345/175 |
| 2010/0123686 A1 | 5/2010 | Klinghult et al. | |
| 2010/0220065 A1 | 9/2010 | Ma | |
| 2011/0012845 A1 | 1/2011 | Rothkopf et al. | |
| 2011/0037706 A1 | 2/2011 | Pasquero et al. | |
| 2011/0080373 A1 | 4/2011 | Wang et al. | |
| 2011/0096013 A1 | 4/2011 | Krumpelman et al. | |
| 2011/0227866 A1 | 9/2011 | Kawaguchi et al. | |
| 2011/0227872 A1 | 9/2011 | Huska et al. | |
| 2011/0235156 A1 | 9/2011 | Kothari et al. | |
| 2012/0038577 A1 | 2/2012 | Brown et al. | |
| 2012/0086666 A1* | 4/2012 | Badaye | G06F 3/0416 345/174 |
| 2012/0086669 A1 | 4/2012 | Kim et al. | |
| 2012/0089348 A1 | 4/2012 | Perlin et al. | |
| 2012/0090757 A1 | 4/2012 | Buchan et al. | |
| 2012/0098760 A1 | 4/2012 | Chuang | |
| 2012/0104097 A1 | 5/2012 | Moran et al. | |
| 2012/0105358 A1* | 5/2012 | Momeyer | G06F 3/0414 345/174 |
| 2012/0169612 A1 | 7/2012 | Alameh et al. | |
| 2012/0188202 A1* | 7/2012 | Tsujino | G06F 3/0412 345/174 |
| 2012/0274602 A1 | 11/2012 | Bita et al. | |
| 2012/0313863 A1 | 12/2012 | Hsu | |
| 2012/0319987 A1 | 12/2012 | Woo | |
| 2013/0076375 A1 | 3/2013 | Hanumanthaiah et al. | |
| 2013/0113732 A1 | 5/2013 | Kang et al. | |
| 2013/0128416 A1 | 5/2013 | Weber | |
| 2013/0176270 A1 | 7/2013 | Cattivelli et al. | |
| 2013/0234977 A1 | 9/2013 | Lin | |
| 2013/0328575 A1 | 12/2013 | Ra et al. | |
| 2014/0085247 A1 | 3/2014 | Leung et al. | |
| 2014/0111953 A1 | 4/2014 | McClure et al. | |
| 2015/0071509 A1 | 3/2015 | Myers | |
| 2015/0135108 A1 | 5/2015 | Pope et al. | |
| 2015/0153829 A1 | 6/2015 | Shiraishi | |
| 2015/0185946 A1 | 7/2015 | Fourie | |
| 2016/0033342 A1 | 2/2016 | Lyon et al. | |
| 2016/0042166 A1 | 2/2016 | Kang et al. | |
| 2016/0062498 A1 | 3/2016 | Huppi et al. | |
| 2016/0070404 A1 | 3/2016 | Kerr et al. | |
| 2016/0314334 A1 | 10/2016 | He et al. | |
| 2016/0378255 A1 | 12/2016 | Butler et al. | |
| 2017/0235403 A1 | 8/2017 | Miller et al. | |

FOREIGN PATENT DOCUMENTS

| | | |
|---|---|---|
| CN | 1707415 | 12/2005 |
| CN | 1714336 | 12/2005 |
| CN | 101046720 | 10/2007 |
| CN | 101427468 | 5/2009 |
| CN | 101950224 | 1/2011 |
| CN | 102016780 | 4/2011 |
| CN | 201828892 | 5/2011 |
| CN | 102103445 | 6/2011 |

(56) References Cited

FOREIGN PATENT DOCUMENTS

| | | |
|---|---|---|
| CN | 102138120 | 7/2011 |
| CN | 102449583 | 5/2012 |
| CN | 102483673 | 5/2012 |
| CN | 204650590 | 9/2015 |
| EP | 2073107 | 6/2009 |
| EP | 2128747 | 12/2009 |
| EP | 2267791 | 12/2010 |
| EP | 2315102 | 4/2011 |
| EP | 2315186 | 4/2011 |
| EP | 2357547 | 8/2011 |
| EP | 2413224 | 2/2012 |
| EP | 2418561 | 2/2012 |
| EP | 2420918 | 2/2012 |
| EP | 2508960 | 10/2012 |
| EP | 2660688 | 11/2013 |
| GB | 2313195 | 11/1997 |
| JP | 2005031425 | 2/2005 |
| JP | 2007310539 | 11/2007 |
| JP | 2010244252 | 10/2010 |
| JP | 2011100364 | 5/2011 |
| JP | 2014052997 | 3/2014 |
| KR | 1020100074005 | 7/2010 |
| WO | WO 97/018528 | 5/1997 |
| WO | WO 2011/156447 | 12/2011 |
| WO | WO 2012/031564 | 3/2012 |
| WO | WO 2012/147659 | 11/2012 |
| WO | WO 2012/160844 | 11/2012 |
| WO | WO 2013/083207 | 6/2013 |
| WO | WO 2013/183191 | 12/2013 |
| WO | WO 2014/018121 | 1/2014 |
| WO | WO 2014/124173 | 8/2014 |

OTHER PUBLICATIONS

Engineers Edge, Common Plastic Molding Design Material Specification, 2015, http://www.engineersedge.com/plastic/materials_common_plastic.htm, 3 pages.

Feist, "Samsung snags patent for new pressure sensitive touchscreens," posted on AndroidAuthority.com at URL: http://www.androidauthority.com/samsung-patent-pressure-sensitive-touch-screens-354860, Mar. 7, 2014, 1 page.

Widdle, "Measurement of the Poisson's ratio of flexible polyurethane foam and its influence on a uniaxial compression model," International Journal of Engineering Science, vol. 46, 2008, pp. 31-49.

* cited by examiner

TOUCH FORCE DEFLECTION SENSOR

CROSS-REFERENCE TO RELATED APPLICATION

This application is a 35 U.S.C. 371 application of PCT/US2013/032697, which was filed on Mar. 15, 2013, and entitled "Touch Force Deflection Sensor," which is incorporated by reference as if fully disclosed herein.

TECHNICAL FIELD

This subject matter of this disclosure relates generally to electronic devices, and specifically to touch screens and other electronic display components. In particular, the disclosure relates to touch screen (or touchscreen) sensors, track pads (or trackpads), and other input devices for mobile phones, personal and tablet computers, and other portable and stationary electronics applications.

BACKGROUND

Touch pads, touch screens and other input-sensing devices have a broad range of applications including computer systems, mobile phones, media players, personal digital assistants, gaming platforms, and other electronic devices. Suitable technologies include a variety of resistive and capacitive-coupled sensor systems, as well as optical, electromagnetic, and surface acoustic wave devices.

In capacitive sensing systems, a conducting grid may be utilized, for example with sets of orthogonal traces separated by a dielectric insulator. The grid functions as a capacitive array, which is sensitive to contact (or proximity) based on changes in the corresponding voltage or charge capacity, for example as manifested in a current output. In resistive devices, contact with the input surface causes changes in resistance across the insulating layer, which is registered by an increase or decrease in corresponding sense currents.

Increasingly, capacitive, resistive and other touch-sensitive systems are incorporated into track pads and visual display devices, providing increased input sensitivity for more flexible device control. As device technologies advance, moreover, an increasing number of control functions can also be integrated into a single device or form factor, including, but not limited to, real-time operation and control of voice and data communications, messaging, media playback and development, gaming, internet access, navigational services, and personal digital assistant functions including alarms, reminders and calendar tasks.

As the range of electronics device functions increases, there is also a desire for more advanced touch screens, track pads, and other input devices. In particular, there is a desire for more advanced input systems that can be adapted to real-time control and display functions for an ever-wider range of different electronic device applications, including track pad and touch screen display devices with improved input sensitivity and tracking capabilities.

SUMMARY

This disclosure relates to force-sensitive input devices, including track pads, touch screens and other control systems with sensitivity to contact forces. In particular examples and embodiments, the disclosure encompasses a touch sensitive input system for an electronic device, with a deflection sensor disposed adjacent to or along the control surface. The deflection sensor is configured to generate a deflection signal, for example based on a touch pattern generated by a user on the surface of a touch screen, track pad, or other force-sensing control device.

A processor is provided in signal communication with the deflection sensor. The processor is operable to generate a deflection map characterizing deflection of the sensing surface, based on the deflection signal. The processor is also operable to generate a force map characterizing force on the sensing surface, based on a transformation of the deflection map. The transformation may be based on a generalized inverse of a compliance operator, which relates the deflection map to the force map.

The compliance operator is not necessarily square, and may instead have a rectangular representation, with no strictly defined inverse. For example, the compliance operator may have more rows than columns, where the rows correspond to entries in the deflection map and the columns corresponding to entries in the force map. Alternatively, the compliance operator may have more columns than rows.

The deflection sensor can be formed of an array of conductive traces disposed in a generally parallel sense with respect to the sensing surface, and configured to generate the deflection signal based on capacitive or resistive coupling. A position sensor may also be disposed with respect to the sensing surface, either combined with the deflection sensor, or provided as an independent system. The position sensor can be configured to generate a position signal based on a touch pattern on the sensing surface, and the processor can be configured to generate a position map characterizing the touch pattern, based on the position signal.

A variety of electronic devices may utilize such a touch-sensitive input system, for example a mobile device or smartphone in which the sensing surface comprises a cover glass configured for viewing a touch screen display. Alternatively, a computing device may include a track pad comprising the sensing surface of the input system. Such devices may be controlled based on characteristics of the force map, for example based on a force magnitude or centroid location, as determined in real time operation of the device.

Exemplary methods of operation include sensing deflection of a control surface on the electronic device, in response to the touch pattern. A displacement or deflection map may be generated, based on the deflection, and a transformation (or transformation operator) may be defined to relate the displacement map to forces imposed on the control surface. A force moment map can be generated by operation of the transformation on the displacement map, where the force moment map describes the imposed force.

For example, the transformation may include a generalized inverse of a compliance operator (or compliance matrix), where the compliance operator relates the displacement map to the imposed forces. The compliance operator need not necessarily be square or invertible. Alternatively, another transformation may be used.

Depending upon application, the force moment map can be generated based only on the deflection data. That is, the displacement map can be transformed independently of any separate position mapping, so that the force moment map describes the force imposed on the control surface based only on deflection of the control surface, absent any other additional position data.

Alternatively, the position of the touch pattern position can also be sensed on the control surface, and a centroid of the force moment map can be determined, based in whole or part on the sensed position. For example, the sensor array may provide both deflection and position data, where the position data are also used to described the force imposed on the control surface, based on the centroid of the touch pattern. This contrasts with independent analysis methods, as described above, where the force magnitudes and centroids are generated independently, based only on the deflection data and displacement mapping, without reference to any other position data or position mapping.

In one particular example, the transformation may comprise a generalized inverse C+ of a compliance operator C, which relates a particular displacement map X to the force F imposed on the surface, for example with X=CF. Such a compliance operator C may have a substantially rectangular representation, so that the compliance operator C has no inverse $C^{-1}$.

Generating the force moment map of the control surface may also include generating a derived output Y, which is related to the force F imposed on the surface and a moment M, for example with Y=MF. The transformation may also determine the derived output via Y=JX and the transformation may include the moment M, so that the derived result is $Y=MC^+X$.

That is, the transformation operator J may be defined by $J=MC^+$, and force moment mapping may be defined operation of the transformation operator on the displacement mapping, for example with $MF=MC^+X$. The moment operator M, in turn, can be defined to determine the characteristics of the force(s) imposed by the touch pattern, for example one or more scalar or "zeroth-order" moments, in order to determine the magnitude of the force, and any number of first, second or higher-order moments, for example to define centroid values based on linear and two-dimensional positioning of the imposed forces across the control or sensing surface.

The transformation (or transformation operator, e.g. $J=MC^+$) can be defined by finite element analysis, utilizing a grid of desired accuracy to define the force (or force-moment) mapping based on an arbitrary number of deflection points. Mechanical stress analysis can also be utilized, based on the material properties of the cover glass, spring membrane, or other control or sensing surface components. Alternatively, the transformation can be defined by physical calibration of the sensing surface, for example using known force and moment inputs, or by any combination of finite element analysis, mechanical stress analysis, and physical calibrations.

The transformation can be stored in the form of a lookup table, in memory on the device, and the force moment map can be generated in real time, based on the displacement map in combination with the lookup table. In particular, a force moment map can be generated in real time based on the displacement map and such a device lookup table, in order to describe operational input forces and magnitudes imposed on the control surface, according to the corresponding user-defined touch patterns. The force moment map may also describe a force-moment distribution imposed on the surface by the touch pattern, for example to describe both force magnitudes and centroids.

To perform the method on a particular electronic device, program code may be stored or embedded on a non-volatile computer readable storage medium, where the program code is executable by a processor on the electronic device to perform any of the control methods and functions described herein. For example, the program code may be executable to sense deflection of a control surface on the electronic device in response to a (e.g., user-defined) touch pattern. A displacement map of the control surface can be generated, based on the deflection, and the displacement map can be transformed into a force moment map.

The transformation operator may include or be based on a generalized inverse of a compliance operator, where the compliance operator relates the displacement map to forces imposed on the control surface by the touch pattern. Forces imposed on the control surface can be determined based on the force moment map, in order to control operation of the electronic device, based on the imposed forces.

In one particular application, the program code may be executable to generate a particular derived output Y, which can be related to force(s) F imposed on the surface via a moment M; that is, with Y=MF. The transformation operator J may also be utilized to define the derived output Y, such that Y=JX.

Such a transformation operator J can also include a generalized inverse $C^+$ of a compliance operator C, which relates the deflection map X to the force F imposed on the surface via X=CF. One such transformation operator, for example, is $J=MC^+$, which may also be defined by $J=M(C^TC)^{-1}C^T$, as expressed in a left-side generalized inverse form. This particular form may corresponds to a compliance operator C with a substantially rectangular representation, for example with more rows m than columns k, and with no well-defined inverse $C^{-1}$, as defined by $CC^{-1}=I$.

The transformation operator J may also include the moment M, for example with $J=MC^+$. Thus, the derived output Y may be determined by $Y=MC^+X$ and by Y=MF. Thus, a particular force moment mapping MF and displacement mapping X may be related by the transformation operator J, for example according to $MF=MC^+X$. Such a transformation operator $J=MC^+$ may be determined by a combination of finite element analysis, calibration, and mechanical stress calculations, as described above, and stored in a lookup table for real-time operation of the electronic device, based on the force input as determined from the deflection mapping.

DETAILED DESCRIPTION

Figure 1:
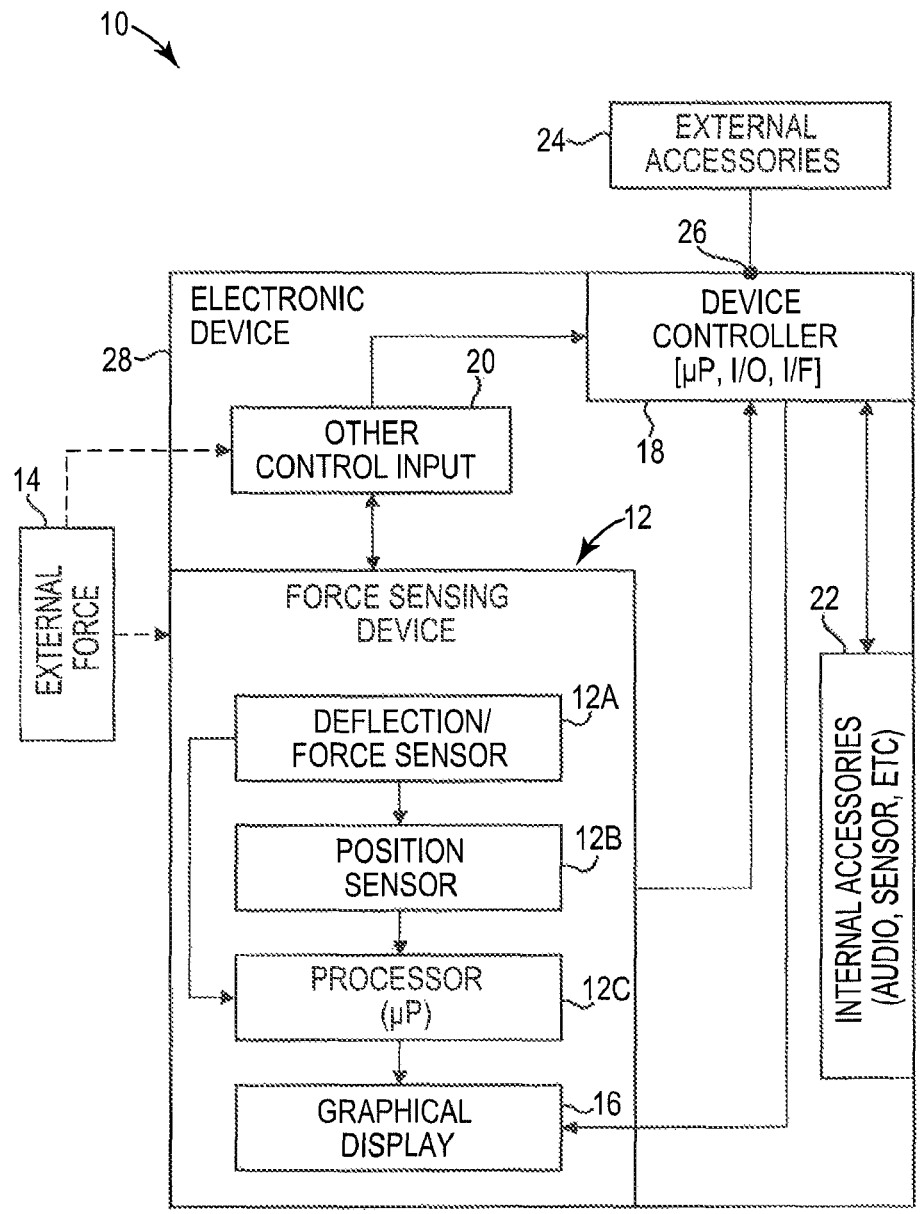
FIG. 1 is a block diagram of an exemplary electronic device with a force-sensitive input system, for example a touch screen or track pad.

FIG. 1 is a block diagram of an exemplary electronic device 10 with force-sensitive input system 12, for example a touch screen, track pad or other electromechanical system configured to receive input from external force 14. Force-sensitive input system 12 provides improved flexibility and functionality for electronic devices 10, as configured for a wide range of different applications including smartphones (smart phones) and other mobile devices, media players, digital assistants, gaming platforms, computing devices and other electronics systems, in both portable and stationary configurations.

Depending upon desired functionality, force-sensitive input system or apparatus 12 may include both a displacement/force or deflection sensor 12A and a position sensor 12B, in either discrete or integrated form. System 12 may also include an internal processor or microprocessor 12C, and may be combined with an integrated graphical display 16, for example a touch screen. Alternatively, electronic device 10 may incorporate force sensing system 12 with a separate or discrete display component 16, for example a force sensing track pad in combination with a separate computer monitor or multimedia display.

Device 10 may also include a separate device controller or processor 18, along with other control or input devices 20, such as home, menu, and hold buttons, volume controls, mute switches, and other control mechanisms 20. In addition, device 10 may include various internal and external accessories 22 and 24, for example audio (speaker and microphone) components, cameras and other sensors, lighting, flash, and indicator systems, and additional specialized systems such as acceleration and motion sensors, gyro and GPS sensors, and other accessory or peripheral features, devices and components.

Device 10 is typically provided within housing 28, for example utilizing a variety of metal, plastic and cover glass components to house force-sensitive input system 12, display 16, controller/processor 18 and additional control and accessory features 20 and 22. One or more external accessories 24 can be coupled to electronics device 10 via a variety of different device ports 26 in housing 28, for example SCSI (small computer system interface), USB (universal serial bus), and other serial and parallel (e.g., SATA and PATA) device ports 26, or using a wireless interface (I/F), such as an infrared (IR), Bluetooth, or radio frequency (RF) device.

Device controller 18 includes microprocessor (pp) and memory components configured to load and execute a combination of operating system and application firmware and software, in order to provide a range of functionality for device 10. Representative device functions include, but are not limited to, voice communications, voice control, media playback and development, internet browsing, email, messaging, gaming, security, transactions, navigation, calendaring, alarms, reminders, and other personal assistant tasks. In order to obtain user input, controller/processor 18 can be coupled in electronic and data communication with force sensing system 12 and one or more additional control buttons or other input mechanisms 20, along with various internal and external components including display 16 and accessory features 22 and 24. Controller/processor 18 can also provide for additional input-output (I/O) and communications features, utilizing a variety of different hard-wired and wireless interfaces and ports 26, as described above.

To accommodate the wide variety of different functionalities contemplated for device 10, input system 12 can be configured to provide a combination of position and force sensing capabilities, offering greater input sensing sensitivity, range, and flexibility. In particular, input device may include force/deflection sensor components 12A, either alone or in combination with position sensor components 12B, in order to provide increased control capabilities for user operation of electronics system or device 10, as described below.

Figure 2:
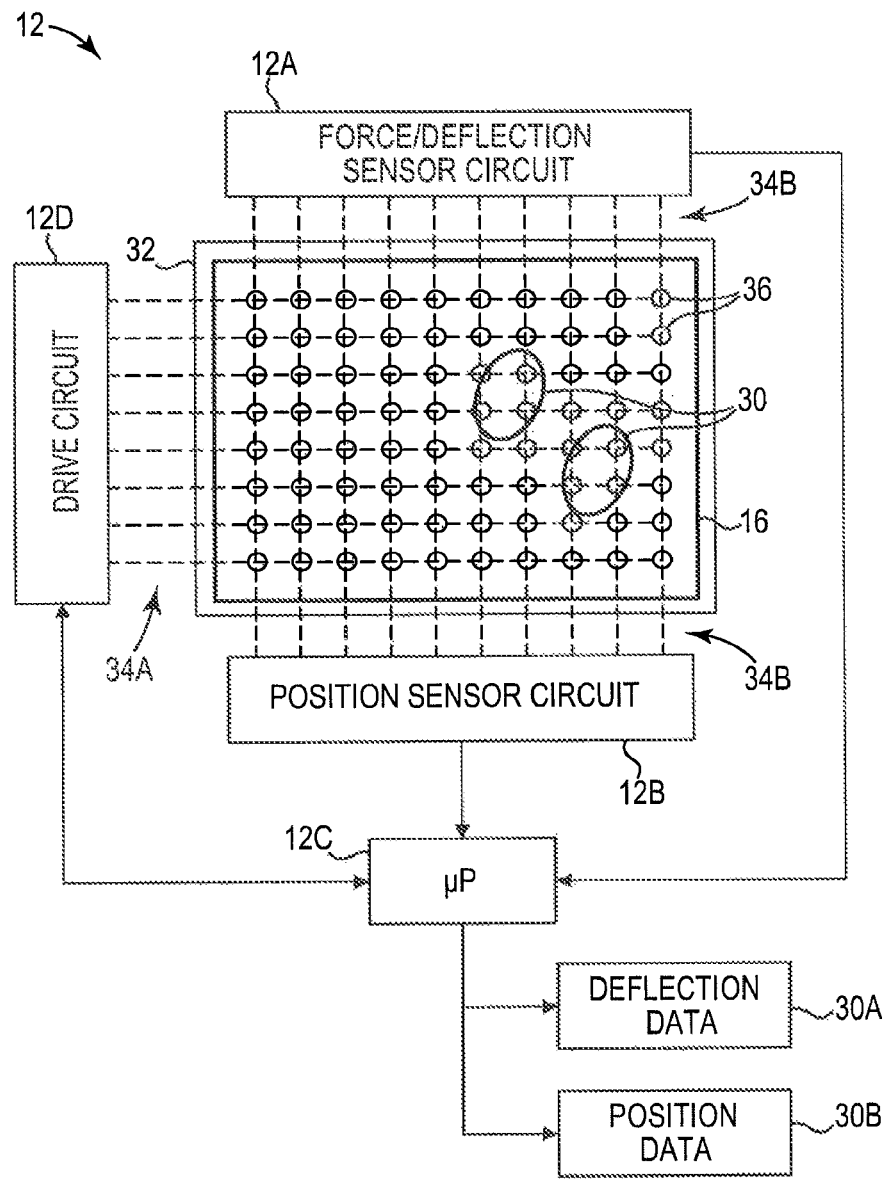
FIG. 2 is a schematic diagram of a force-sensitive input system for the device.

FIG. 2 is a schematic diagram of force-sensitive input system 12, for example a force-sensitive touch screen or touch pad device. In this particular example, force-sensitive input system 12 includes a force or deflection/displacement sensor (or circuit) 12A and position sensor (or circuit) 12B, in combination with a processor 12C and driver circuit 12D. Alternatively, force/deflection sensor circuit 12A may be provided independently, without position sensor circuit 12B.

Force-sensitive input system 12 is configured to recognize single and multiple touch events or touch patterns 30, as defined along touch-sensitive surface 32 by drive and sensor traces 34A and 34B. In particular, system 12 may be configured to generate one or both of force/deflection (e.g., displacement) data 30A and position data 30B for time-separated, near-simultaneous and substantially simultaneous touch patterns 30, including data characterizing the corresponding touch position, velocity, size, shape, and force magnitude, in order to provide for more flexible control and operation of electronic devices 10, as described above with respect to FIG. 1.

In the grid or array-based configuration of FIG. 2, touch-sensitive surface 32 is defined by an array of crossed sensor traces 34A and 34B, for example a set of substantially parallel driver traces 34A, in combination with a set of substantially perpendicular or orthogonal sensor traces 34B, as shown in FIG. 2. Alternatively, the sensor trace and drive trace designations may be reversed, and trace sets 34A and 34B can both be active, or both passive.

In one particular example, drive circuit 12D is coupled to drive traces 34A, with force/deflection and position sensor circuits 12A and 12B coupled to sensor traces 34B. Sensor traces 34B may also be oriented in a substantially perpendicular (e.g., vertical) or orthogonal sense with respect to (e.g. horizontal) drive traces 34A. More generally, traces 34A and 34B may have any orientation, horizontal, vertical, or otherwise, and may intersect at a range of angles, or be formed in a polar coordinate arrangement, or other form. Force/deflection and position sensor circuits 12A and 12B can also be combined into an integrated force/position sensor configuration, or utilize separate sensor traces 34B, for example with two or more sets of sensor traces 34B arranged at different skew angles.

Processor 12C generates force/deflection and position data 30A and 30B based on signals from one or more force, position, and drive circuits 12A, 12B and 12D, as described above. Depending upon configuration, processor 12C may be provided as an "on-board" or integrated processor element, as shown in FIG. 2, or as an off-board or external processor component, for example as provided within a device controller 18, as shown in FIG. 1, or using other internal or external data processing components.

In combined sensor/display configurations, as shown in FIG. 2, touch sensitive surface 32 may incorporate or accommodate a display devices 16, for example a graphical or media display for use in a force-sensitive touch screen embodiment of input system 12. Alternatively, input system 12 may be provided independently of any display 16, for example with touch-sensitive surface 32 configured for use in a track pad, or similar input device.

Sensing points or nodes 36 on touch-sensitive surface may be defined by the intersections of drive and sensor traces 34A and 34B, as shown in FIG. 2. For example, crossed resistive or capacitive traces 34A and 34B may be separated by an electrically insulating dielectric spacer or spring membrane layer, with sensitivity to force (or deflection) based on changes in the capacitive or resistive coupling, as defined at various sensing points 36. Capacitive systems encompass both self-capacitance and mutual capacitance-based measurements, in which the capacitance at different sensing points 36 varies based on the shape and force characteristics of touch patterns 30, as well as the proximity and electrical properties of the external object(s) used to generate touch patterns 30.

Alternatively, an array of discrete sensor components 36 may also be utilized, for example resistive, capacitive, piezoelectric, or optical sensors, either alone or in combination with trace arrays 34A and 34B. In combined trace/sensor array configurations, discrete sensors may be provided at intersections 36 of traces 34A and 34B, as shown in FIG. 2, or between traces 34A and 34B, or at a combination of intersections and other locations.

In each of these configurations, sensing system or device 12 is operable to detect and track a range of attributes for each touch pattern 30, including, but not limited to, position, size, shape, force, and deflection. In addition, system 12 is also configurable to identify distinct touch patterns 30, and to determine additional attributes including centroid, moment, velocity and acceleration, as individual touch patterns 30 track across sensing surface 32.

The number and configuration of sensing points 36 may vary, depending on desired resolution, sensitivity, and other characteristics. In touch-screen applications, the distribution of nodes 36 may also depend upon desired optical properties, for example transparency, as determined by the density of nodes 36 in an indium tin oxide (ITO) matrix, or other transparent material used to form sensing surface 32.

Force/deflection and position data 30A and 30B are utilized to define the shape and other characteristics of touch patterns 30 at particular points in time, allowing corresponding commands to be executed on the host device. For example, individual sensor points or nodes 36 may function substantially independently, with each sensor point 36 generating separate sensor signals. Alternatively, multiplexed signals may be generated along crossed drive and sensor traces 34A and 34B, and processor 12C may provide demultiplexing capability. Drive traces 34A can also be sequentially activated in order to generate time-separated sensor signals, providing substantially independent force/deflection and position data 30A and 30B.

For force-related data 30A, however, touch patterns 30 typically result in deflections across a substantial area of sensing surface 32. Thus, force/deflection data 30A from separate sensor points 36 are not generally independent, and data 30A from a number of separate sensor points 36 may be required to determine the corresponding force magnitudes, centroids, and moments. This analysis may be performed based on a pixilated image or displacement map of sensing surface 32, as described below.

Figure 3A:
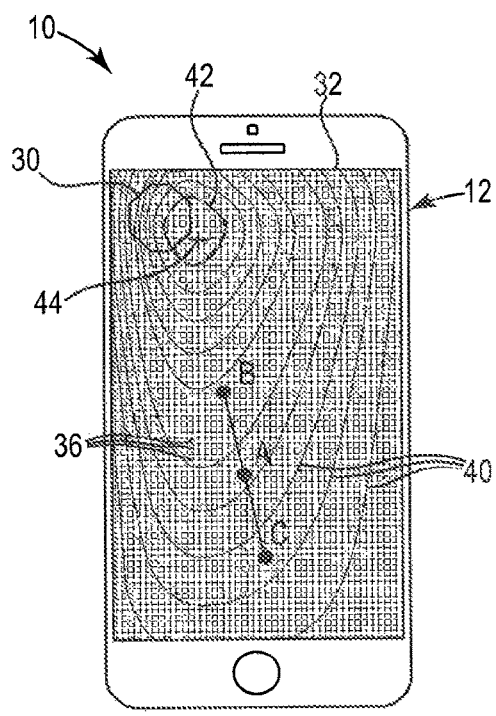
FIG. 3A is schematic illustration of a representative force pattern sensed by the device.

FIG. 3A is schematic illustration of a representative force pattern sensed by electronic device 10. As shown in FIG. 3A, touch pattern 30 is presented as an applied force on sensing surface 32 of input system 12, for example by touching a finger or stylus to the touch screen display on a mobile phone or smartphone application of electronic device 10, or using a calibrated weight. Input system 12 generates a two-dimensional displacement or deflection map 40 based on pattern 30, fusing an array of overlapping traces 34A and 34B or sensors 36 to measure deflection, as described above.

Note that the position of touch pattern 30 does not necessarily coincide with the maximal displacement in deflection map 40, due to the stress response properties and perimeter mount configuration of the cover glass, track pad or other sensing/control surface 32. In particular, maximal displacement region 42 may shift toward the center of sensing surface 32, along with centroid 44, which represents the "center of mass" or amplitude-weighted mean of the displacement function, as characterized by the (e.g. first-order) moments of deflection map 40.

To determine the input forces associated with touch pattern 30, force amplitudes, moments and other information may thus be generated from deflection data 30A (see FIG. 2), and utilized to generate two-dimensional deflection map 40. Deflection map 40, in turn, can be transformed to produce a force moment mapping, with moments including the scalar input force and centroid 44. Alternatively, system 12 may also utilize single or multi-touch position data 30B to determine the input forces associated with a particular touch pattern 30, for example at the corresponding finger or stylus positions. The displacement-to-force algorithm may also accommodate force/centroid accuracy and noise effects, capacitive (or other sensor) accuracy, pixel-by-pixel noise contributions, and mechanical tolerances.

In one approach, a linear deflection force model is utilized, in which deflection map 40 is determined based on a sum of deflections due to multiple individual touch patterns 30, or from a single touch pattern 30 extending across an area of sensing surface 32. For example, the deflection due to a 200 g weight equivalent input (e.g., a force of about 1.96 N) may be approximately twice the deflection due to that from a 100 g weight equivalent (0.98 N), as extended across a range of different pixels or nodes (i.e., sensing positions) 36.

Note that the linear (or linear superposition) model does not imply that deflection scales linearly with distance, only with applied force. Thus, the value of deflection map 40 at a given point A, e.g., midway between points B and C, is not necessarily the average of the deflection map for the same input force applied at the endpoints B and C. However, this assumption may become approximately true for short distances (that is, as points A and B get closer together). System 12 may also utilize capacitances and other sensor measurements that do not necessarily scale linearly with displacement, for example by compensating for nonlinearities in the conversion algorithm, and based on physical calibrations.

Deflection map 40 can be converted into a force measurement (or force mapping) based on a compliance analysis, as performed in vector, matrix, or tensor form. That is, various forces F applied to the cover glass or other sensing surface 32 can be modeled based on the corresponding measured displacements X (e.g., deflection map 40), using a compliance operator (or compliance matrix) C that relates force to displacement, for example by:

$$X=CF.\qquad [1]$$

The particular formats used for the force and displacement terms F and X are arbitrary, and vary from application to application (along with compliance term C). For example, displacement X and force F can each be modeled as two-dimensional matrix or tensor quantities, based on the values of deflection map 40, and the corresponding force distribution on the cover glass, track pad, or other sensing surface 32. In this approach, compliance tensor C may have a four-dimensional or higher-order form, based on the two-dimensional forms of displacement and force terms X and F.

Alternatively, force term F can be "unwrapped" into a one-dimensional vector, for example with m entries corresponding to the number of discrete locations at which the input forces are modeled along sensing surface 32, rearranged into a linear (e.g., row or column) vector form. Similarly, displacements X can also be represented as a one-dimensional quantity, with deflection map 40 unwrapped into k discrete entries, in either column or row vector form. In this approach, compliance term C can be represented as a two-dimensional matrix or tensor operator, for example with k rows corresponding to the entries in displacement term X, and m columns corresponding to the entries in force term F.

More generally, displacements X and forces F can be represented as vector, matrix, or tensor quantities of arbitrary dimension, in either covariant or contravariant form, and compliance term C may vary accordingly. In particular, n applied forces or touch patterns 30 may be associated with n displacement mappings X, utilizing m×n and k×n matrix or tensor forms for force F and displacement X, respectively, with a correspondingly higher-order representation for compliance tensor or matrix operator C.

In physical applications of system 12, compliance operator C can be derived from plate mechanics, utilizing the known stress and strain properties of the cover glass or tracking surface to relate input forces F and displacements X. Alternatively, or in addition, finite element analysis (FEA) techniques may also be used, for example by simulating a set of applied force scenarios F based on different touch patterns 30, tabulating the resulting displacements X based on simulated deflection mappings 40, and deriving the elements of compliance term C based on the relationship X=CF.

These may be considered direct approaches, as applicable to a range of electronic devices 10 with cover glass/touch screen and track pad systems 12 having well defined stress response characteristics. Various calibration methods may also be employed, either alone or in combination with mechanical analysis and FEA techniques. For example, a robot arm or other mechanical system can be utilized to physically position a set of different calibration weights or other predefined force generating elements along a particular touch screen, track pad, or other sensing surface 32, in order to generate various known touch patterns 30. Thus, tabulating displacements X based on the resulting displacement map 40 will give compliance term C directly, for use in modeling force distributions F based on arbitrary input.

Figure 3B:
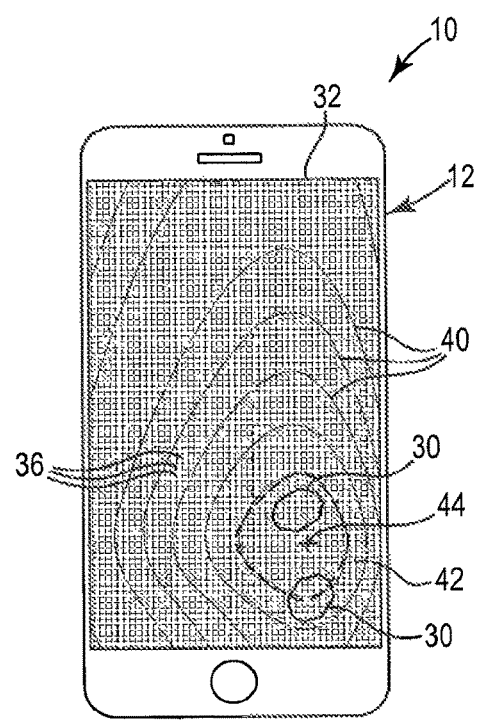
FIG. 3B is schematic illustration of an alternate force pattern sensed by the device.

FIG. 3B is schematic illustration of an alternate force pattern in which multiple touch patterns 30 presented, for example by touching two or more fingers to the cover glass or other sensing surface 32 of a smartphone or other mobile device 10, as shown in FIG. 3A. Input system 12 generates a two-dimensional deflection map 40 based on touch patterns 30, corresponding to displacements X for use in generating a force input model F based on compliance operator C, as described above.

In general, compliance operator C can be constrained to have more row entries k than column entries m, because displacements X can be sampled for any force model F on an arbitrarily fine grid. For example, finite element analysis and other techniques may be utilized, based on an arbitrary number of discrete displacement sampling points k, as described above. Alternatively, compliance operator C may be defined in a substantially square form, with an equal number of rows k and columns m, or with more columns m than rows k.

More generally, however, modeling or test forces F may be selected to generate compliance operator C in full rank form; that is, with k independent rows (or m independent columns), such that the rank of C is equal to the larger of k and m. Thus, compliance operator C may be defined such that $C^TC$ (C-transpose C) is invertible, even when there is no strictly defined inverse $C^{-1}$ (i.e., where $C^{-1}$ does not exist, there being no $C^{-1}$ that satisfies $C^{-1}C=I$). This property, in turn, may be utilized to generalize a force/displacement mapping algorithm, as described below.

In particular, when the displacement sensor response to an applied force F is described by X=CF, forces F are related to displacements X, but the relationship is not obvious because one must work "backwards" from displacement X to forces F, while there is no guarantee that any particular compliance operator C has an inverse $C^{-1}$ (that is, there is no guarantee of a closed form such as $F=C^{-1}X$). In fact, there is not even any guarantee that C is a square matrix, because in the general case there may be more rows k than columns m (or vice-versa), based on the ability to model displacements in an arbitrary number of discrete locations, as described above.

In order to determine the force mapping F, therefore, a derived result Y may be desired, for example a derived result Y that is related to applied force F in some predictable fashion. In particular, a derived result Y is desired for which displacements X can be used to generate a relationship for a force map or force-moment mapping based on a particular moment M. For example, a relationship of the form MF=Y may be defined, from which imposed forces F can be determined from a particular displacement mapping X, for various different choices of moment M; that is:

$$X \to MF = Y. \qquad [2]$$

More generally, this may be considered the common case for deriving a scalar force $F_{total}$ for example according to:

$$X \to F_{total} = [1\ 1\ \ldots\ 1]_m F, \qquad [3]$$

or a force+moment vector from a corresponding matrix of appropriate dimension, e.g., for a two-dimensional mapping, of dimension 2-D+1:

$$X \to \begin{bmatrix} F_{total} \\ Mx \\ My \end{bmatrix} = \begin{bmatrix} 1 & 1 & & 1 \\ x_1 & x_2 & \ldots & x_m \\ y_1 & y_2 & & y_m \end{bmatrix} F. \qquad [4]$$

The above forms can also be utilized to generate forces F according to n different finger positions or other touch patterns 30, for example:

$$X \to \begin{bmatrix} F_1 \\ F_2 \\ \vdots \\ F_n \end{bmatrix}, \qquad [5]$$

or, to generate a full two-dimensional force mapping:

$$X \to F. \qquad [6]$$

For a linear force/displacement algorithm, the desired transformation (or operator) J can be expressed as $$JX = MF, \qquad [7]$$

where operator (or matrix) J transforms displacement term X into a desired system output Y=MF. Using the relationship X=CF, this is:

$$JCF = MF. \qquad [8]$$

Conceptually, therefore, $J=MC^{-1}$ would in principle be a suitable form, except that compliance operator C is not necessarily square, as described above, and $C^{-1}$ does not necessarily exist. Thus, there is no general, closed-form solution, and the desired force/displacement conversion algorithm is neither simple, nor obvious.

An alternative approach is to consider the generalized inverse or "pseudoinverse" $C^+$, for example the left (pseudo) inverse, as defined by:

$$C^+_{[L]} = (C^T C)^{-1} C^T. \quad [9A]$$

This form may be appropriate for a rectangular matrix, for example with more row entries k than column entries m. Based on this definition, moreover, the pseudoinverse $C^+$ may be constrained to exist by selection (or construction) of a full-rank compliance operator C, where $C^T C$ has inverse $(C^T C)^{-1}$, as described above. Alternatively, the right (pseudo) inverse may be used:

$$C^+_{[R]} = C^T (CC^T)^{-1}, \quad [9B]$$

For example where C is defined as a rectangular matrix with more column entries m than row entries k.

In the case that C does happen to have an inverse $C^{-1}$, the generalized inverse $C^+$ can be defined so that the generalized inverse or pseudoinverse is substantially the same as the inverse (that is, with $C^+ = C^{-1}$). In the more general case that C does not have an inverse (that is, $C^{-1}$ is not well defined), however, the generalized inverse or pseudoinverse $C^+$ provides a "best" or least squares approximation, which can serve the function of an inverse for operations on strictly rectangular (non-square) matrices and other non-invertible forms.

In particular, the generalized inverse $C^+$ may be suitable for operations including linear matrices (or vectors) X and F, as described above, in order to generate a more general force/displacement mapping algorithm suitable for physical applications including force-sensitive input systems for electronic devices. For example, the selection $J = MC^+$ (left inverse case) gives $$J = M(C^T C)^{-1} C^T, \quad [10]$$

and, for the derived result Y:

$$Y = JX = M(C^T C)^{-1} C^T X. \quad [11]$$

The transformation operator $J = M(C^T C)^{-1} C^T$ (or $MC^+$) can be calculated offline and stored in a device lookup table (LUT), for example via finite element analysis, or using a combination of finite element analysis, mechanical stress/displacement analysis, and physical calibrations, as described above. The individual values in $(C^T C)^{-1} C^T$ can also be corrected for operational effects, such as temperature, aging, etc., for example by storing an initial (or "ab initio") value for the transformation in the lookup table, and scaling appropriately.

Alternatively, a right pseudoinverse may be used. For the general case, however, $$Y = JX = MC^+ X, \quad [12]$$

which yields derived result Y based on displacement mapping X, as desired. The derived result also has the form $MF = Y$, as described above, so that:

$$MF = MC^+ X. \quad [13]$$

Thus, a particular or selected force-moment mapping MF may be determined in terms of the displacements X, based on the transformation operator $J = MC^+$. The transformation operator, in turn, can be determined based on a combination of analytical and calibration methods, as described above, and stored in a lookup table in order to provide real-time force and moment analysis, based on a particular displacement mapping X.

The singular value decomposition (SVD) of compliance matrix C can also be used to identify or determine which degrees of freedom in the force map may be more difficult or challenging to reconstruct from displacements X, for example based on noise and numerical stability considerations. In particular, the characteristics of compliance matrix C may be determined by $$C = U\Sigma V^T, \quad [14]$$

where $$\Sigma_{ii} = \sigma_i. \quad [15]$$

Right-singular vectors (columns of V) corresponding to small singular values a give degrees of freedom in the force map that may affect displacement more weakly (e.g., as compared to larger values). Thus, recovering the components of a given force map F corresponding to each value $\sigma_i$ will tend to be a more poorly conditioned problem, as the values of $\sigma_i$ get smaller.

Figure 4A:
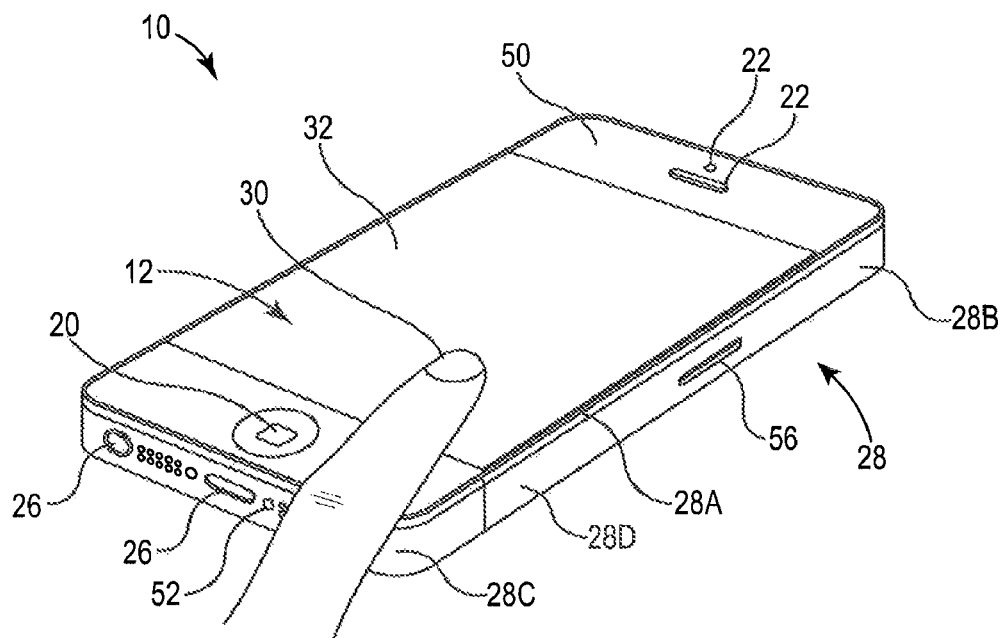
FIG. 4A is a perspective view of an exemplary electronic device utilizing the force sensing system, in a touch screen application.

FIG. 4A is a perspective view of an exemplary electronic device 10 utilizing force-sensing input system 12. In this particular example, device 10 is configured for use in a portable device application such as a mobile phone or smartphone, e.g., as shown in FIGS. 3A and 3B, above. Alternatively, device 10 may be configured as a media player, digital assistant, touch screen, tablet computer, personal computer, computer display, or other electronic device, in either portable or stationary form.

As shown in FIG. 4A, force-sensitive input system 12 is integrated into a front cover glass component, for example with sensing surface 32 provided in the form of a display window for a touch screen or other display system, as defined between border regions 50. In cover glass implementations, sensing surface 32 may be formed of a glass or other durable transparent material, for example silica glass, indium tin oxide, a clear plastic polymer such as acrylic or polycarbonate, or a transparent ceramic such as crystalline aluminum oxide or sapphire. Force and position sensitivity to different touch patterns 30 on surface 32 can be provided via a layer array of capacitive or resistive traces, or using discrete piezoelectric devices or other force and position sensing devices, for example as described above with respect to FIG. 2.

Housing assembly 28 and frame 28A are typically formed of metals such as aluminum and steel, or from plastic, glass, ceramics, composite materials, and combinations thereof. Frame 28A may be used to attach cover glass/sensing surface 32 to various top, bottom and side housing components 28B, 28C, and 28D, as shown in FIG. 4A, or via an adhesive coupling. Depending on configuration, device 10 can also accommodate a number of additional control and accessory features, including menu and hold buttons, volume switches, and other control mechanisms 20, and audio, camera, lighting, and other accessory features 22. One or more ports or connector apertures 26 may also be provided for power and data communications with device 10, with various mechanical fasteners 52 and access ports 54 to fix cover glass/sensing surface 32 to housing assembly 28, and to provide access to internal components such a flash memory device or subscriber identity module (SIM card).

Figure 4B:
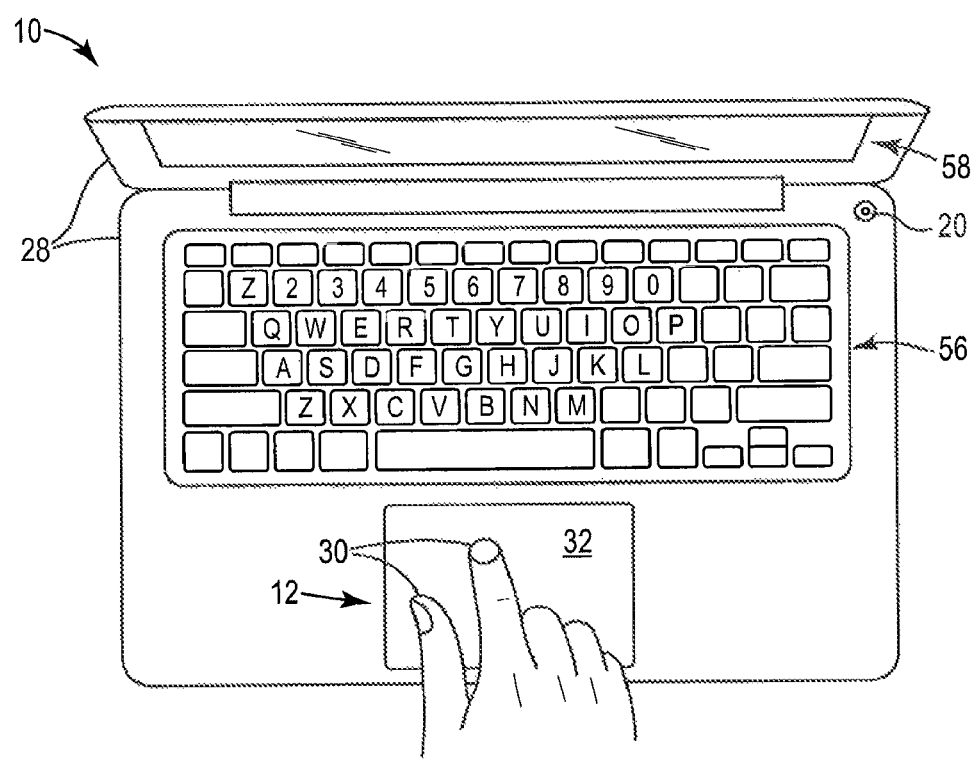
FIG. 4B is a perspective view of an exemplary electronic device utilizing the force sensing system, in a track pad application.

FIG. 4B is a perspective view of electronic device 10 in an alternate configuration, for example a laptop or notebook computer, a minicomputer, a personal computer, or other portable or stationary data processing application. As shown in FIG. 5B, housing 28 may accommodate an input or keyboard component 56 and separate (e.g., upright or hinged) display 58.

In this particular example, input system 12 is provided in the form of a force-sensitive track pad or multi-touch tracking system, with sensing or tracking surface 32 positioned below or adjacent to keyboard 56. In track pad applications of input sensing system 12, sensing surface 32 may incorporate layered sets of capacitive or resistively coupled conductive traces, for example with a dielectric spring membrane or other dielectric separator. Alternatively, piezoelectric devices or other discrete position and force sensors may be used, as described above.

As illustrated in FIGS. 4A and 4B, force-sensitive input system 12 is configured to measure the spatial profile of deflection or deformation in sensing surface 32, in response to the forces applied in touch pattern(s) 30. Due to the bending plate (or spring membrane) mechanics, however, deflection is not necessarily localized to the specific area or region of touch pattern 30, but may be distributed and shifted, as shown above in FIGS. 3A and 3B. Thus, it is not trivial to recover or determine an accurate estimate of the applied forces corresponding to touch pattern(s) 30, from the displacement of sensing surface 32 alone.

Different algorithms may thus be applied, as described above, in order to estimate the touch forces based on a displacement or deflection map of the screen or track pad surface 32. Depending upon application, the algorithm may also utilize knowledge of the finger positions or touch patterns 30 to improve the force estimate, for example as obtained from a capacitive (e.g., multi-touch) sensor or other position sensing system. Alternatively, the force reconstruction algorithm may be defined based on the deflection map alone, absent any such independent position data. Such techniques are applicable to a range of different electronics applications and devices 10 for which force-sensitive input is desirable, including both display-based and non-display based input devices 12, such as force-sensitive touch screens and track pads.

Figure 5:
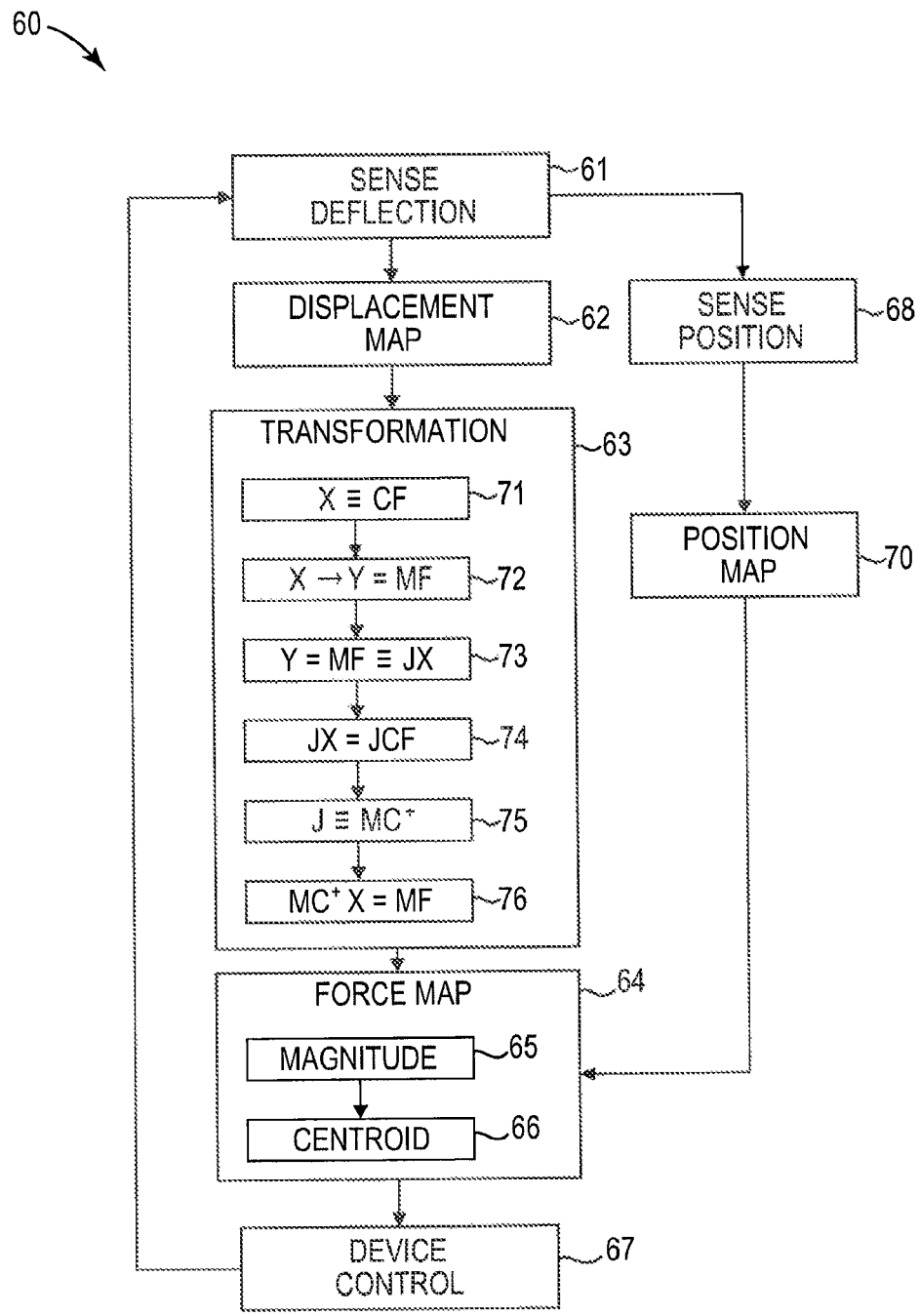
FIG. 5 is block diagram illustrating an exemplary method for operating an electronic device, based on the sensed input force.

FIG. 5 is block diagram illustrating an exemplary method 60 for operating an electronic device based on a sensed input force, for example an electronic device 10 with force-sensitive input system 12, as described above. In this particular example, method 60 may include one or more steps including, but not limited to, sensing deflection of a control surface (step 61), mapping displacement of the surface (step 62), and transforming the displacement map (step 63) to generate a force map or force-moment mapping (step 64).

The force-moment mapping (step 64) may include one or more force magnitudes (step 65) or centroids (step 66), which can also be utilized to control the device (step 67). Depending on application, the device may also provide for position sensing (step 68) of the touch pattern on the control surface, which can be used to generate a position map (step 70), for example for use in refining the force-moment mapping (step 64).

Sensing deflection (step 61) can be performed for touch patterns on the control surface of a track pad, touch screen display, or similar control input device, using a capacitive or resistive grid or discrete sensor array to generate deflection data, as described above. The deflection data (e.g., a set of deflection sensor signals) can be converted into a displacement map (step 62), for example using a two-dimensional pixel grid to characterize displacements across the (e.g., horizontal) control surface, with the displacements measured in a third (e.g., vertical) direction. The two-dimensional data can also be unwrapped into one-dimensional vector form, for example a row or column vector, in either covariant or contravariant form.

Depending on control surface configuration, the sensor array may also provide for position sensing (step 68), as described above, in either a single-touch or multi-touch configuration. The position data can also be mapped (step 70), providing a two-dimensional image of the touch pattern (s) on the control surface. The position map can be utilized in conjunction with the force mapping, for example in order to refining the force magnitude determination (step 65), or to determine one or more centroids of the force distribution (step 66)

More generally, force-moment mapping (step 64) may be performed independently of position sensing (step 68), and absent any other explicit position data characterizing the touch patterns on the control surface (step 70), outside the deflection data (step 61) and displacement map (step 62). In these applications, one or both of the force magnitudes (step 65) and centroids (step 66) of the force distribution are determined based on deflection alone, by generating the displacement map (step 62) based only on deflection data (step 61). That is, the displacement map (step 62) is transformed (step 63) independently of, and without reference to, any separate position mapping (step 70) or position data (step 68).

Transformation of the displacement data is non-trivial, however, as described above. In particular, a compliance matrix C may be defined (step 71), relating the displacement map X to the force distribution F via X=CF. Because the compliance mapping C is not necessarily square, however, and may not have an inverse $C^{-1}$, a derived result or system output Y is desired (step 72), where the desired system output Y is related to the forces imposed on the control surface by a moment mapping M; that is, with Y=MF.

The derived result Y, in turn, is determined based on a transformation of the displacement map (step 73), for example with transformation operator J defined by Y=JX. Based on the definition of the compliance operator C, the transformation operator J can also be described in terms of the force mapping F (step 74), for example with JX=JCF.

Thus, a generalized inverse or pseudoinverse operator approach (step 75) may be utilized, where $C^+$ is the generalized inverse of compliance operator C, and the transformation operator is $J=MC^+$. The generalized inverse operator or pseudoinverse $C^+$, in turn, can be defined in either a left-side or right-side convention, based on the number of rows and columns in compliance matrix C, and the corresponding dimension (or number of entries) in the force and displacement mappings F and X, for example as defined in one-dimensional row or column vector form, as described above, or using covariant or contravariant vectors of arbitrary order.

The transformation operator J may also include a particular moment M (e.g., $J=MC^+$, as shown above), and may be defined offline, based on a combination of physical calibrations, stress and strain analysis, and finite element analysis techniques. The resulting transformation data can be stored in a lookup table, so that the desired force moment mapping MF can be determined based on the displacement mapping X (step 76), using the lookup table in real time. The form of the force mapping output (step 64) can be defined by the desired moment mapping M, and may include one or more force magnitudes (step 65) and centroids (step 66), which characterize the force distribution due to the touch patterns on the control surface.

Device control (step 67) is performed based on the force outputs (step 64), either alone or in combination with independent position data (steps 68 and 70). For example, the force magnitude (step 65) may be utilized to define a scalar input, such as a volume, playback speed, or zoom ratio, with or without reference to position. A position may also be derived from the deflection data, for example in order to generate one or more centroids (step 66), in order to control any of the electronic device operations described herein. Alternatively, the force outputs (step 64) may be used in conjunction with an independent position mapping (step 70), with one or both of the force magnitude (step 65) and centroid (step 66) determined at least in part based on position sensing (step 68), as well as deflection sensing (step 61).

While this invention has been described with reference to exemplary embodiments, it will be understood by those skilled in the art that various changes can be made and equivalents may be substituted for elements thereof, without departing from the spirit and scope of the invention. In addition, modifications may be made to adapt the teachings of the invention to particular situations and materials, without departing from the essential scope thereof. Thus, the invention is not limited to the particular examples that are disclosed herein, but encompasses all embodiments falling within the scope of the appended claims.

We claim:

1. A touch sensitive input system for an electronic device, the system comprising:
   a deflection sensor disposed with respect to a sensing surface of the electronic device, the deflection sensor configured to generate a deflection signal based on deflection of the sensing surface; and
   a processor in signal communication with the deflection sensor, the processor operable to generate a displacement map characterizing a non-binary measurement of deflection of the sensing surface based on the deflection signal, the processor further configured to generate a force map characterizing force on the sensing surface based on a transformation of the displacement map; wherein
   the transformation of the displacement map comprises a generalized inverse of a compliance operator relating the displacement map to the force map; and
   the compliance operator comprises rows corresponding to entries in the displacement map and columns corresponding to entries in the force map.

2. The system of claim 1, wherein the compliance operator has a rectangular representation, such that the compliance operator has no inverse.

3. The system of claim 1, wherein the deflection sensor comprises an array of conductive traces disposed in a generally parallel sense with respect to the sensing surface, the array of conducting traces configured to generate the deflection signal based on capacitive coupling.

4. The system of claim 1, further comprising a position sensor disposed with respect to the sensing surface, the position sensor configured to generate a position signal based on a touch pattern on the sensing surface, wherein the processor is further operable to generate a position map characterizing the touch pattern, based on the position signal.

5. A mobile device comprising the touch sensitive input system of claim 1, wherein the sensing surface comprises a cover glass configured for viewing a touch screen display.

6. A computing device comprising the touch sensitive input system of claim 1, and further comprising a track pad comprising the sensing surface.

7. A method of operating an electronic device, the method comprising:
   sensing a deflection of a control surface of the electronic device in response to a touch pattern on the control surface;
   generating a displacement map of the control surface, based on a non-binary measurement of the deflection;
   defining a transformation relating the displacement map to force imposed on the control surface by the touch pattern; and
   generating a force moment map by operation of the transformation on the displacement map; wherein
   the force moment map describes the force imposed on the control surface by the touch pattern; and
   the transformation is based on a compliance operator relating the displacement map to force imposed on the control surface, the compliance operator comprising rows corresponding to entries in the displacement map and columns corresponding to entries in the force moment map.

8. The method of claim 7, wherein generating the force moment map comprises transforming the displacement map absent other position data relating to the touch pattern on the control surface, such that the force moment map describes the force imposed on the control surface based only on the deflection, independently of any other such position data.

9. The method of claim 7, further comprising:
   sensing a position of the touch pattern on the control surface;
   determining a centroid of the force moment map based on the position of the touch pattern; and
   describing the force imposed on the control surface by the touch pattern, based on the centroid.

10. The method of claim 7, wherein the compliance operator has a substantially rectangular representation, such that the compliance operator has no inverse.

11. The method of claim 7, wherein generating the force moment map of the control surface comprises generating a derived output equal to a product of the force imposed on the control surface and a moment.

12. The method of claim 7, further comprising determining the transformation by one or more of finite element analysis, mechanical stress analysis, and physical calibration of the displacement of the control surface by known force and moment inputs.

13. The method of claim 12, further comprising storing a transformation operator in the form of a lookup table.

14. The method of claim 13, wherein transforming the displacement map comprises generating a force moment map based on the displacement map and the lookup table, such that the force moment map describes the force imposed on the control surface by the touch pattern.

15. The method of claim 13, wherein transforming the displacement map comprises generating a force moment map based on the displacement map and the lookup table, such that the force moment map describes a force-moment distribution imposed on the control surface by the touch pattern.

16. A non-volatile computer readable storage medium having program code embedded thereon, the program code executable by a processor of an electronic device to perform a method comprising:
   sensing a deflection of a surface of the electronic device in response to a touch pattern thereon;
   generating a displacement map of the surface, based on a non-binary measurement corresponding to the deflection;
   transforming the displacement map into a force moment map via a transformation operator, the transformation operator based on a generalized inverse of a compliance operator relating the displacement map to force imposed on the surface by the touch pattern, the transformation operator comprising rows corresponding to entries in the displacement map and columns corresponding to entries in the force moment map;

determining the force imposed on the surface based on the force moment map; and controlling operation of the electronic device, based on the force.

17. The storage medium of claim 16, the method further comprising generating a derived output Y related to a force F imposed on the surface and a moment M, such that Y=MF;

wherein the transformation operator J determines the derived output Y according to the displacement map X, such that Y=JX;

wherein the transformation operator J comprises a generalized inverse $C^+$ of a compliance operator C relating a displacement map X to the force F imposed on the surface, such that X=CF; and wherein the transformation operator J further comprises the moment M, such that the force F imposed on the surface, the moment M, and the displacement mapping X are related by the transformation operator $J=MC^+$ according to $MF=MC^+X$.

* * * * *